(12) United States Patent
LaRuffa (10) Patent No.: US 6,347,870 B1
(45) Date of Patent: Feb. 19, 2002

(54) HANDLING ASSEMBLY FOR FLUID PROCESSING OF OPHTHALMIC LENSES

(75) Inventor: Anthony LaRuffa, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/540,643

(22) Filed: Mar. 31, 2000

(51) Int. Cl.⁷ .......................... G02C 7/04; B29D 11/00; B08B 9/20
(52) U.S. Cl. .................. 351/177; 264/2.6; 134/25.5
(58) Field of Search .................. 351/160 R, 160 H, 351/161, 162, 177; 264/2.6, 233; 134/25.5

(56) References Cited

U.S. PATENT DOCUMENTS

| | | | |
|---|---|---|---|
| 5,466,147 A | 11/1995 | Appleton | 425/412 |
| 5,476,111 A | 12/1995 | Andersen | 134/58 |
| 5,573,108 A | 11/1996 | Hamilton | 206/5.1 |
| 6,068,798 A | 5/2000 | Lesczynski | 264/2.6 |
| 6,207,086 B1 * | 3/2001 | Schlagel et al. | 264/2.6 |

OTHER PUBLICATIONS

AN International Publication No. WO 97/13635 Entitled "Cleaning Process" published Apr. 17, 1997.

* cited by examiner

*Primary Examiner*—Scott J. Sugarman
(74) *Attorney, Agent, or Firm*—Katherine McGuire (57) ABSTRACT

An assembly for fluid processing of an array of ophthalmic lenses includes a support having an array of holes in which an array of lens receptacles are removably positioned for fluid processing. A cover is placed over the support and lenses and include a series of grooves forming fluid passages for the entry and exit of fluid as the assembly is submerged and removed from a bath of processing fluid. The assemblies may be stacked upon each other and placed in a frame for processing batches of lenses at a time.

9 Claims, 7 Drawing Sheets

HANDLING ASSEMBLY FOR FLUID PROCESSING OF OPHTHALMIC LENSES

BACKGROUND OF THE INVENTION

The present invention generally relates to industrial material handling. More particularly, the present invention relates to a unique handling assembly for fluid processing of an array of contact lenses. Typical fluid processing steps in the manufacture of soft contact lenses include hydration of the dry lens to a wet (soft) lens, and extraction of unwanted constituents remaining in the lens. The contact lenses are preferably supported upon a pallet which, together with a cooperatively configured cover, enables fluid processing of a plurality of contacts lenses in an efficient manner. The invention is also applicable to other types of ophthalmic lenses requiring fluid processing, for example, spectacle and intraocular lenses.

Static cast molding of contact lenses is known. See, for example, U.S. Pat. No. 5,466,147 issued to Bausch & Lomb Incorporated, the entire reference of which is incorporated herein by reference. A single mold unit comprises a female mold section having a concave optical surface and a male mold section having a convex optical surface. The female and male mold sections are complimentary shaped and mateable to form a lens-molding cavity between the facing concave and convex optical surfaces of the female and male mold sections, respectively.

The basic process for cast molding a lens is as follows. A quantity of liquid lens material (monomer) is dispensed into the concave optical surface of the female mold section and the male mold section is seated upon the female mold section with the concave and convex surfaces thereof facing one another to form a lens-shaped mold cavity. The joined female and male mold sections form a single mold unit which is subject to a curing cycle (e.g., by thermal or UV radiation) thereby causing polymerization of the lens material in the mold cavity. Once the lens material has cured, the male and female mold sections must be separated to retrieve the cured lens.

The opening or release of the mold sections must be carried out in a manner which will not harm the delicate lens. Once the lens has polymerized in the mold cavity, the lens and any lens flash will have an adhesive bond to the opposite concave and convex mold surfaces. Thus, the release of the male mold section from the female mold section must be of a force strong enough to break the adhesive bond of the lens and lens flash to the opposing mold surfaces, yet not so strong or haphazard that the optical surfaces of the lens are harmed by the release process. Should the lens crack or be otherwise damaged during the mold release process, the lens must be scrapped, thereby lowering the output yield and increasing manufacturing costs.

Once the mold sections have been separated, the lens must be released from the mold section on which it is retained. Both wet and dry release methods of lens release have been proposed in the prior art. In wet lens release methods, an aqueous solution is used to wet the hydrophilic lens which absorbs water and swells, causing the lens to separate from the mold surface. Once the lens has hydrated and released from its associated mold surface, the lens becomes a free-floating body in the hydrating fluid. If this process is carried out in a bath, there must thus be some means to contain the hydrated lens, yet not inhibit the access of the hydrating fluid to the interior of the mold and lens. Otherwise, the lenses must be "fished out" from the hydration bath using tweezers, a very labor intensive prospect.

Typically, the molds in which the lenses have been cured are carried on a support pallet in a predetermined array. Once the molds have been opened, the mold sections carrying the adhered lenses are transferred to a lens release station as discussed above. Once the lens has been released from the mold in which it is carried, the pallet of molds and lenses are readied for hydration/extraction processing.

It is desirable to be able to batch process contact lenses through different stations of a manufacturing process for efficiencies of manufacturing. It is thus desirable to be able to fluid process contact lenses in batches. Various methods of batch processing contact lenses through a fluid processing step have been proposed. The handling of the lenses during fluid processing include processes where the lenses are still in the mold or, alternatively, the lenses have been transferred to a different receptacle. It is furthermore known to use a bath process where batches of lenses may be submerged in a bath of fluid. It is also known to use sequential baths to ensure adequate fluid processing of the lenses. Alternatively, fluid may be applied to each individual contact in metered amounts, followed by extraction of the fluid from the mold section without disturbing the lens. This may be accomplished with the apparatus and method of U.S. Pat. No. 6,068,798 issued May 30, 2000 and which is assigned to the present assignee herein, Bausch & Lomb Incorporated.

An example of bath hydration may be seen in co-pending UK application no. 00079301 filed on Mar. 31, 2000 and which is assigned to the present assignee herein. In this method, a pallet containing an array of female mold sections having respective lenses adhered thereto is stacked on a pallet having a like array of empty male mold sections thereon. An empty pallet is stacked upon the female pallet to prevent the female mold sections from falling from the female pallet during hydration. The stack of three pallets form a single unit for bath hydration, although multiple units may be stacked together and placed in a carrier for submerging in the bath. The pallets are cooperatively configured such that the female and male mold sections are spaced by an amount sufficient to allow fluid to enter between the facing sections to reach the lens, but spaced small enough so as to prohibit the hydrated, loose lens from escaping from between the respective female and male mold sections. This method is especially geared toward a manufacturing method where the male mold section is used for packaging of the contact lens as seen in U.S. Pat. No. 5,573,108, also of common ownership with the instant application for patent.

In the case where the lenses must be transfer r ed from the mold in which they were formed to a separate package for downstream processes (e.g., hydration) or for final packaging to the consumer (e.g., transfer to a blister package), the lenses must undergo some amount of handling to effectuate this transfer process. In prior art methods, lenses have been transferred manually by an operator using a pair of tweezers to grasp the lens and transfer it from the mold to a package receptacle. This, of course, is an extremely labor intensive method of lens handling and also creates a high chance of lens damage caused by the direct contact with the tweezers and the operator's inability to consistently control the amount of force used with the tweezers when handling a lens. The use of pick-and place units is also known for transferring lenses between stations, however, this must also be carried out with extreme precision so as to not damage or dislocate the lens during transfer.

Another example of lens hydration carriers may be seen in U.S. Pat. No. 5,476,111 to Anderson et al (Johnson & Johnson Vision Products, Inc. The '111 patent discloses a lens transfer plate which first picks an array of female mold sections together with their associated lenses to form a first hydration carrier. The first hydration carrier is submerged in a bath to hydrate the lens through fluid passages extending through each lens pick-up. The mold section is then released, with the lens remaining with the lens transfer plate through surface tension. The lens transfer plate and lens assembly then couple to a hydrating base which has a like array of hydrating receptacles each having their own fluid passages for passing hydrating/extraction fluid to the lens contained therein. Once so treated, the lenses must be picked from the hydration base and transferred to yet another receptacle for further downline processing such as inspection and packaging, for example. The '111 method and apparatus is rather complex in that it requires many complex robotic handling stations, as well as many handling components and carriers. Final packaging of the lenses is not discussed in any detail, although it is clear that the lenses must be removed from the handling carriers for transfer to a final package.

It is thus clear that lens handling is a critical parameter in the contact lens manufacturing line. Since contact lenses are extremely delicate, small articles of manufacture having precise optical surfaces, they must be handled with extreme care so as to not damage the lens and increase costs to the manufacturing operation. It is thus an object of a contact lens manufacturing line to use a contact lens handling system which minimizes the amount of direct contact of the handling apparatus with the lenses.

SUMMARY OF THE INVENTION

The present invention addresses the need for an efficient method of batch-processing contact lenses through various fluid processes. The invention provides a support for an array of dry contact lenses which may be individually carried in the mold in which they were formed, or in a different receptacle in which they have been previously deposited following removal from the mold. The invention further provides a unitary cover plate for positioning over the array of contact lenses on the support, thereby creating a fluid processing carrier unit. Multiple units may be stacked upon each other for batch processing.

The upper and lower surfaces of the cover plate are uniquely configured with a pattern of connecting grooves which create a series of fluid conduits. Thus, upon submerging the unit comprising the support, lenses and cover in a bath, fluid enters through the fluid conduits to reach and process the lenses. A second series of grooves form passages for the escape of air between the support, lenses and cover plate as they are placed in the bath, and also allow for the drainage of fluid as the support and cover plate are removed from the bath.

In a second aspect of the invention, the cover plate may optionally be also utilized as a stripper plate during transfer of lenses from their respective molds to receptacles positioned upon the support, as further discussed in co-pending U.S. patent application Ser. No. 09/540,250 filed on Mar. 31, 2000 and of common ownership herewith. When used in this manner, the cover provides an apparatus and method for transferring a dry contact lens from its associated mold section to a separate receptacle which is not only non-destructive to the lens, but also prevents the problem of unintentional lens displacement upon lens transfer to the receptacle.

DETAILED DESCRIPTION

Figure 1A:
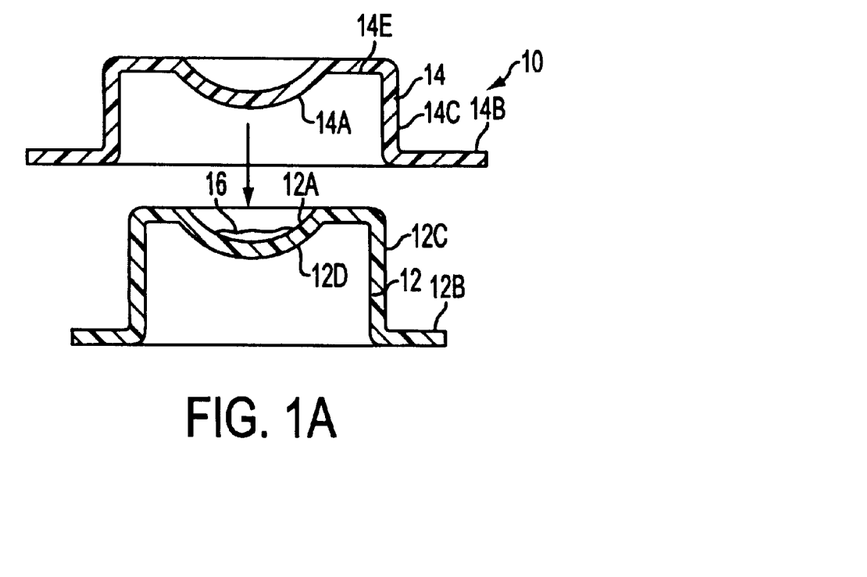
FIG. 1A is a cross-sectional view of a de-coupled mold unit comprising a male mold section shown spaced above a complimentary female mold section.
Figure 1B:
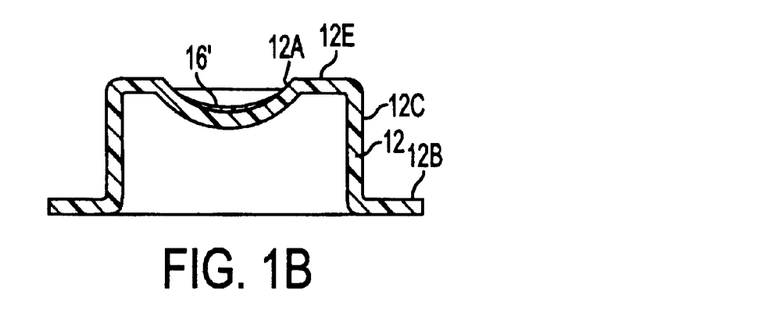
FIG. 1B is a cross-sectional view of the female mold section showing a molded lens retained on the concave surface of the mold section.
Figure 2:
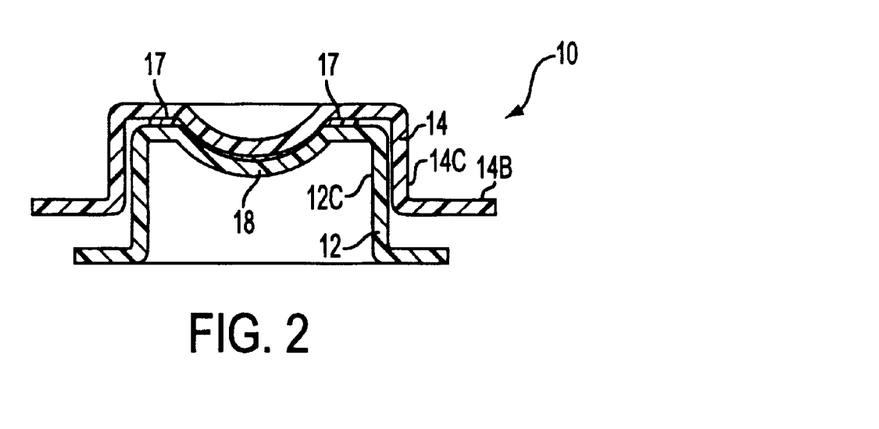
FIG. 2 is the view of FIG. 1A, except the male and female mold sections are joined in the intended manner.

Referring now to the drawing, there is seen in FIGS. 1 and 2 a representative prior art contact lens mold unit 10 having a female mold section 12 and a complimentary male mold section 14 having respective concave and convex optical molding surfaces 12a, 14a. To mold a lens, a quantity of liquid lens material 16 (e.g., monomer) is dispensed into the female mold section and the male mold section is seated upon the female mold section which creates a lens-shaped mold cavity 18 defined by the facing optical mold surfaces 12a, 14a (see FIG. 2). Each mold section 12,14 includes a respective annular wall section 12C,14C which allows a sliding piston/cylinder type action as the male mold section 14 is seated upon the female mold section 12. Each mold section further includes an annular flat section 12E, 14E extending radially outwardly of the associated mold surface 12A, 14A, meeting associated annular wall portions 12C, 14C at the outer perimeter of the annular flat section 12E, 14E, respectively. Each mold section 12,14 further includes an annular flange 12B,14B extending radially outwardly of associated annular wall sections 12C,14C.

The mold sections 12, 14 are typically injection molded using polypropylene, polystyrene or polyvinylchloride, for example, and are used only once to a mold a single lens due to degradation of the optical surfaces thereof after molding of a lens therein. The quantity of monomer 16 dispensed in female mold section 12 is sufficient to permit a slight overflow of the monomer upon seating the male mold section 14 thereon which ensures a complete fill of the cavity to the periphery where the lens edge will form. Upon fully seating the male section upon the female section, the excess monomer flows radially outwardly of the mold cavity 18. Upon curing, this excess monomer forms an annular flash ring 17 between annular flat sections 12E,14E, commonly referred to as a "monomer ring" in the art.

Thus, once a mold unit 10 has been filled and capped as seen in FIG. 2, it is subjected to a curing cycle which polymerizes the monomer inside the mold cavity 18. Typical contact lens curing methods include UV radiation and/or thermal (e.g., oven) curing. An accurate cure profile, whether using UV and/or thermal means to effectuate the cure, is determinable according to the mold and monomer type by those skilled in the art, and may also be determined by trial and error without undue experimentation. Once curing is complete, the male mold section 14 is separated from the female mold section 12 to reveal the lens 16' which has formed therein (FIG. 1B). The mold release process must break the adhesive bond between the mold sections, yet not damage the lens which remains on one of the mold surfaces. In the preferred embodiment described and illustrated herein, the lens 16' remains on the female concave optical surface 12A at mold release as seen in FIG. 1B, and the lens flash 17 remains with the associated male mold section 14 (not separately shown), although this may vary depending on the specific mold configurations being used as desired. Thus, immediately following mold release, the lens 16' remains bonded to female mold surface 12a and is in the dry, rigid state (i.e., it has not yet been hydrated).

As stated above, the invention in a first aspect provides a lens handling assembly for fluid processing of a batch of lenses. In a second aspect of the invention, the present invention provides a lens handling assembly for retrieving a loosened lens from the mold section and transferring the lens to a receptacle in a manner substantially preventing the problem of accidental lens dislocation. FIGS. 3A–3D illustrate the invention with regard to the second aspect of the invention, although it is understood that the inventive lens handling assembly may be used with or without the second aspect of the invention where the assembly is also used during lens transfer to another receptacle.

Thus, referring to FIGS. 3A–3D, a pallet 20 having an array of through-holes 20' formed therein is provided wherein a plurality of lens receptacles 30 are removably positioned in a respective through-hole 20'. Pallet 20 further includes a series of interconnecting grooves $20G_1$ and $20G_2$ along the lower surface thereof (FIGS. 3A and 3B) which define a plurality of abutments 23 therebetween which act to engage respective surfaces on the upper surface of cover 50 in the manner to be described (see also FIG. 6). A dry lens 16' is positioned in a respective receptacle 30, either prior or subsequent to receptacle 30 being placed in pallet 20. It is further noted that the receptacle 30 may be the mold section in which lens 16' was formed (e.g., mold section 12 or 14). Further, rather than being individually populated into pallet 20, the mold sections may be joined permanently in an array to form their own support, taking the place of a separate pallet 20. In the preferred embodiment shown in the figures, individual receptacles 30 are provided in pallet 20, and lenses 16' are subsequently deposited therein via a pick-and-place vacuum head 40. Although only a single vacuum head 40 and receptacle 30 are shown in FIGS. 3A–3D for the sake of clarity, it is understood that an array of receptacles 30, lenses 16' and vacuum heads 40 would be available to fully realize the efficiencies of the assembly. In the preferred embodiment, an arrays of 3×5 are used in the assembly.

Figure 3A:
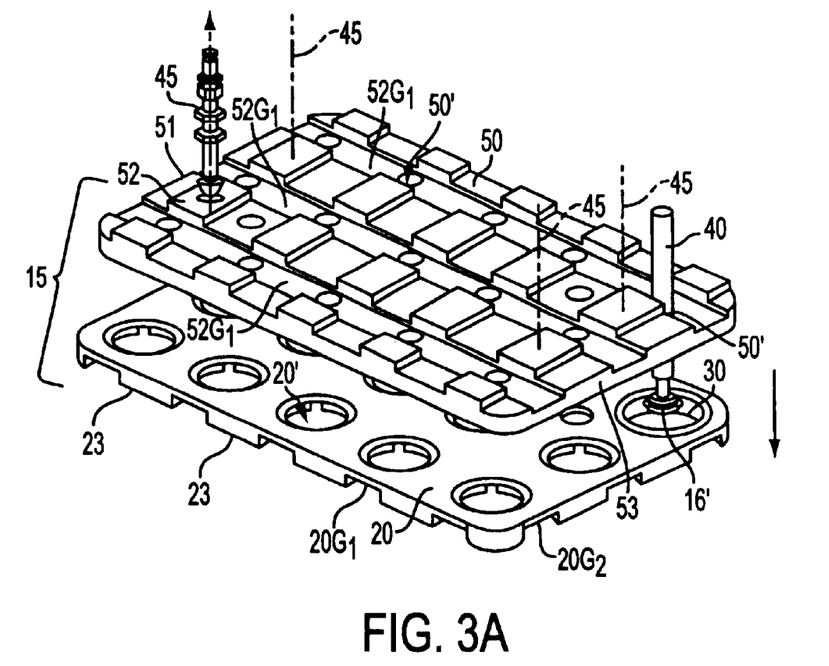
FIGS. 3A and 3B are perspective and cross-sectional views, respectively, showing the cover plate also acting as a stripper plate during lens transfer where the lens pick-up head and lens are positioned immediately prior to release of the lens in a respective lens receptacle.
Figure 3B:
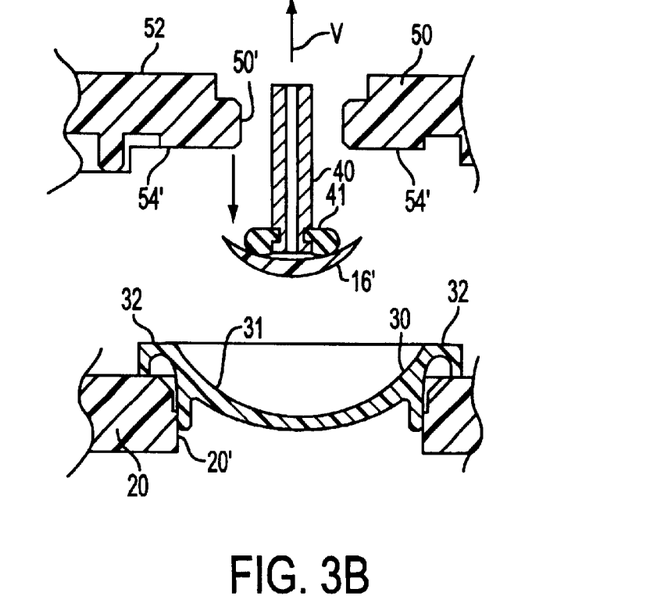

Once lenses 16' have been placed in a respective receptacle 30, a cover plate 50 is placed thereover as shown in FIGS. 3C, 3D, and 5A–6. The pallet 20, receptacles 30, lenses 16' and cover 50 form a single lens handling assembly 15 in accordance with the invention. Automated means may be utilized to place cover 50, such as vacuum heads 45 which are positioned to engage the upper cover surface 52 as seen in FIG. 3A (only one head 45 being shown for clarity). As seen in FIGS. 3A and 3B, lens pick-up head 40 extends freely through a respective hole 50' formed in a like array of 5×3 in cover 50, which array aligns with the array of holes 20' in pallet 20. Thus, the cover 50 is held about the shaft of lens pick-up heads 40 by vacuum heads 45, with each lens 16' engaged upon a respective pick-up head tip 41. The cover 50, together with pick-up heads 40 and 45, are lowered over a respective pallet 20 as seen in FIGS. 3A and 3B until cover 50 comes to rest on pallet 20 and lens 16' is spaced slightly above (preferably not touching) receptacle surface 31. The vacuum "V" on lens pick-up head 40 is then released, thereby dropping lens 16' to fall gently to receptacle surface 31. The vacuum to pick-up head 45 is also released at this time, thereby disengaging cover 50.

Once the lens 16' has been released into receptacle 30, the pick-up heads 40 and 45 are raised with lens pick-up heads 40 withdrawing back through respective cover holes 50'. As seen best in FIG. 3D, the diameter d2 of lens 16' is larger than the diameter d1 of cover hole 50' such that lens 16' cannot escape therethrough. The pick-up head 40 is not larger than the hole diameter d1 so that pick-up head 40 (including tip 41), may freely pass through cover hole 50'. As such, in this optional embodiment of the invention, cover 50 acts to positively capture lens 16' as lens 16' is transferred to receptacle 30 by pick-up head 40. This provides yet a further advantage of the invention by substantially preventing the problem of unintentional lens dislocation.

Discussion is now turned to more detailed aspects of cover 50 with regard to its functionality during fluid processing of lenses 16' within assembly 15. Referring to both FIGS. 3 and 4, cover 50 is seen to include an upper surface 52 and opposite lower surface 54, each including a series of grooves 52G, 54G, respectively. As discussed more fully below, grooves 52G, 54G provide fluid passages for both liquids (e.g., water) and gases (e.g., air) during liquid processing of lenses 16' within assembly 15.

Figure 3C:
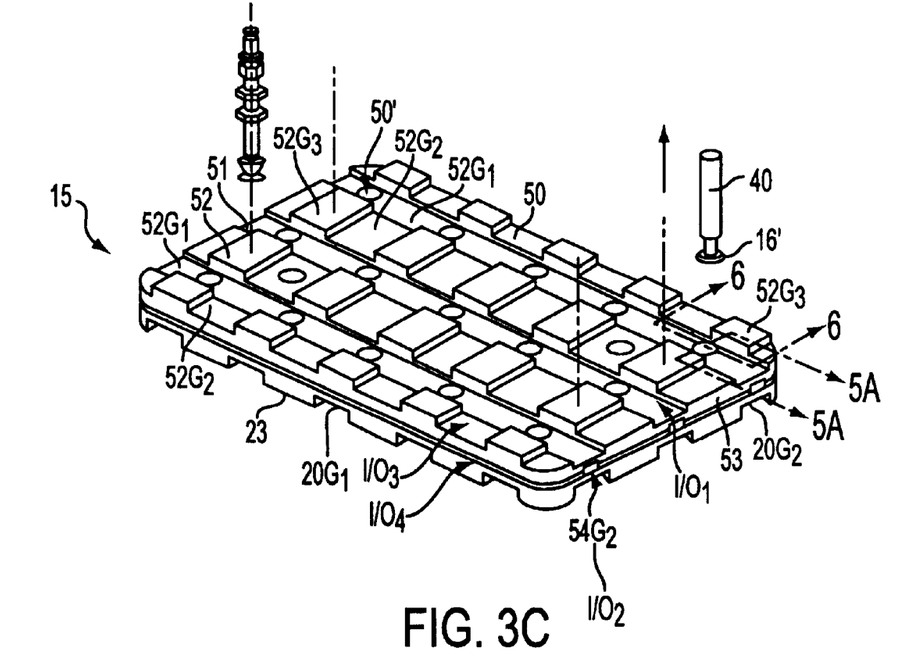
FIGS. 3C and 3D are perspective and cross-sectional views, respectively, showing the lens pick-up head being retracted from the cover immediately following release of the lens in a respective receptacle.
Figure 3D:
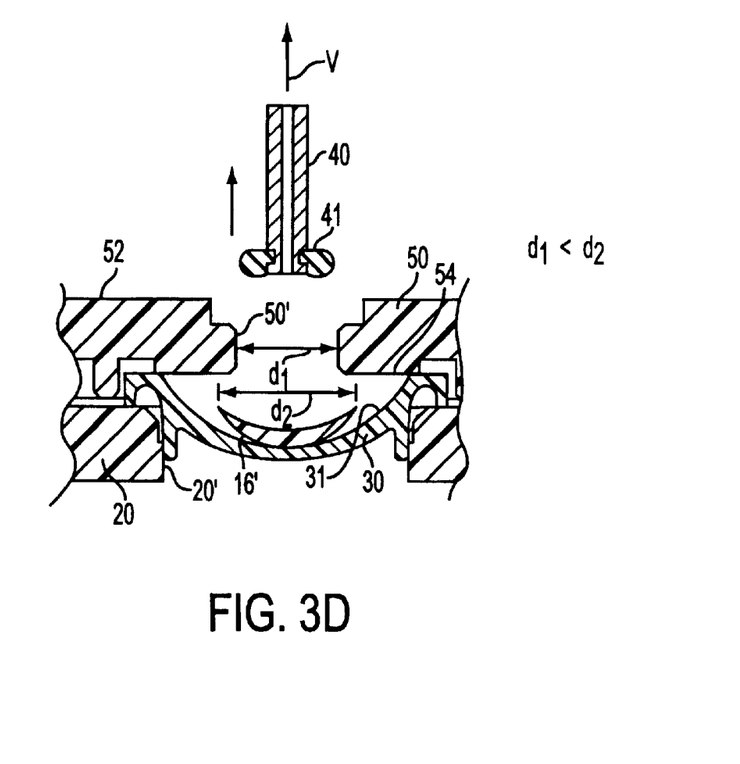

Referring first to upper surface grooves 52G and FIGS. 3A, C and 4D, grooves $52G_1$ extend along each row of 5 holes 50' from edge 51 to opposite edge 53. A second set of stepped up grooves $52G_2$ extend between these rows of grooves $52G_1$, and also alternate with further stepped up surfaces $52G_3$.

Figure 4A:
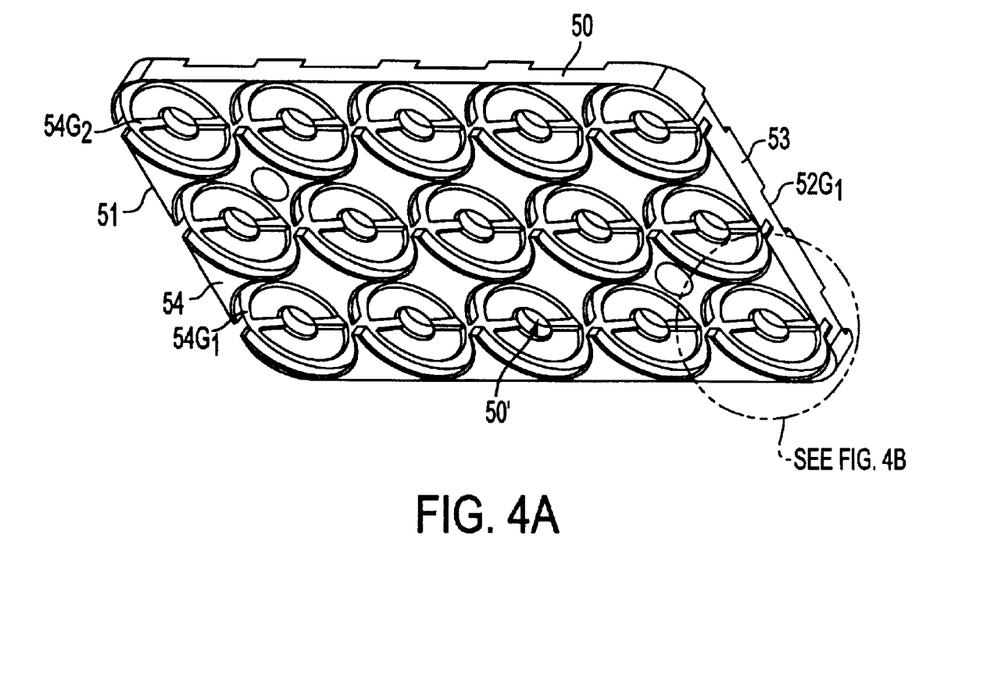
FIG. 4A is a bottom, perspective view of the cover.
Figure 4B:
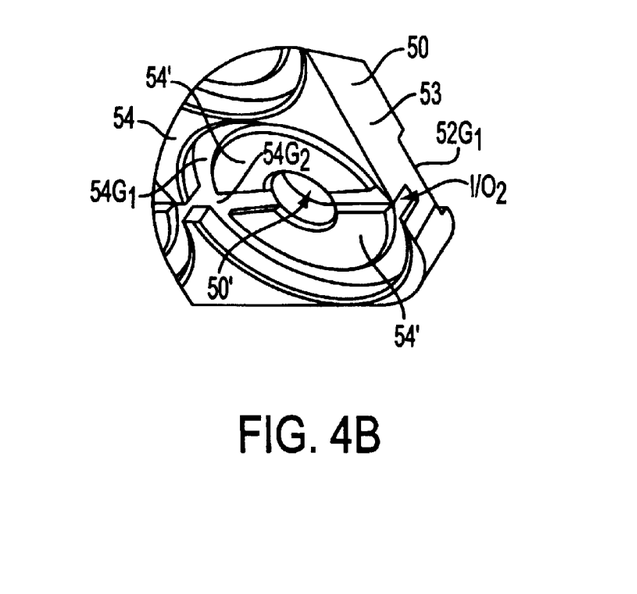
FIG. 4B is an enlarged, detail view of the cover of FIG. 4A.
Figure 4C:
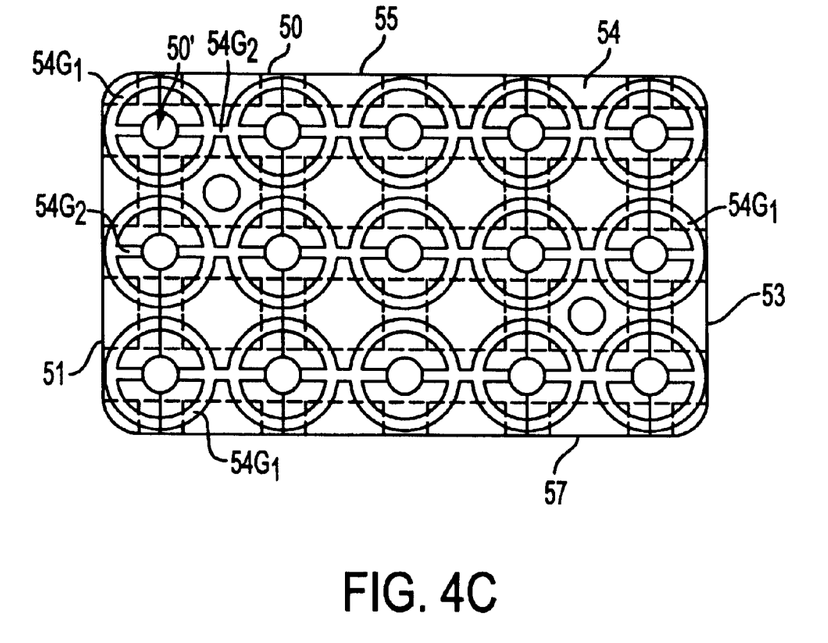
FIG. 4C is a bottom plan view of the cover of FIGS. 4A and 4B.
Figure 4D:
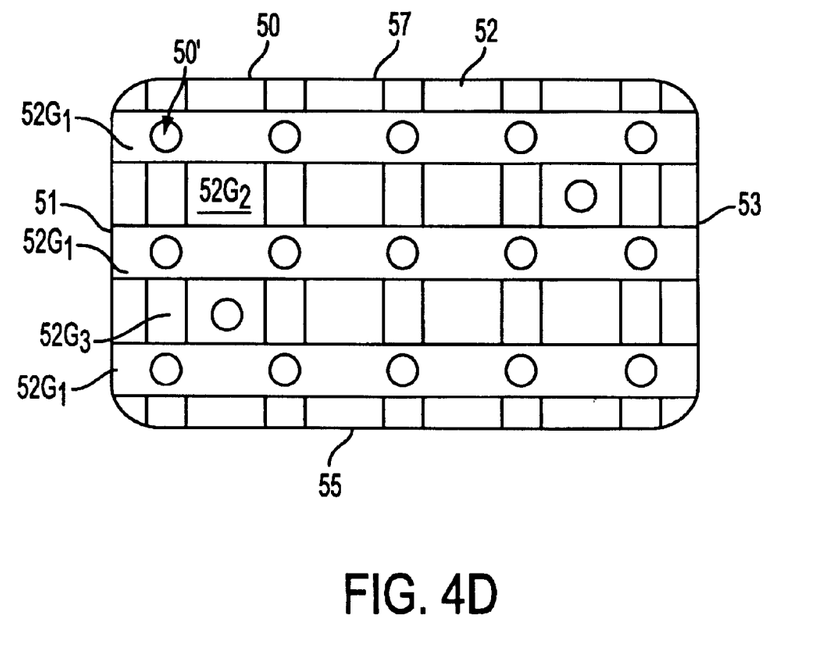
FIG. 4D is a top plan view of the cover.
Figure 5A:
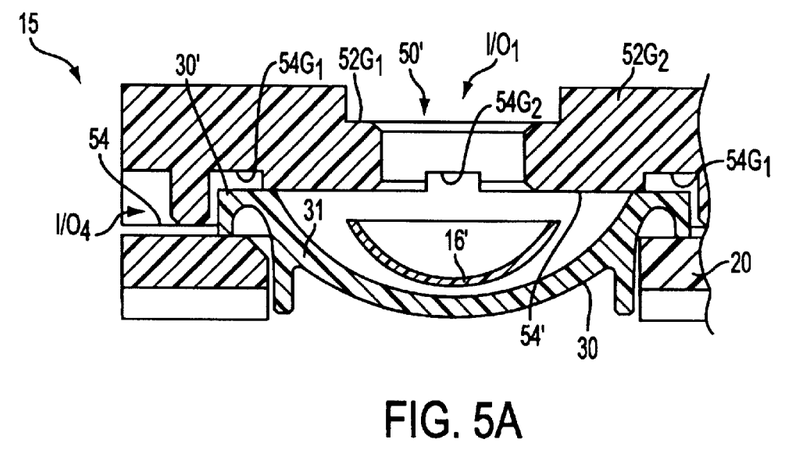
FIG. 5A is a cross-sectional view as taken along the line 5A—5A in FIG. 3C.
Figure 5B:
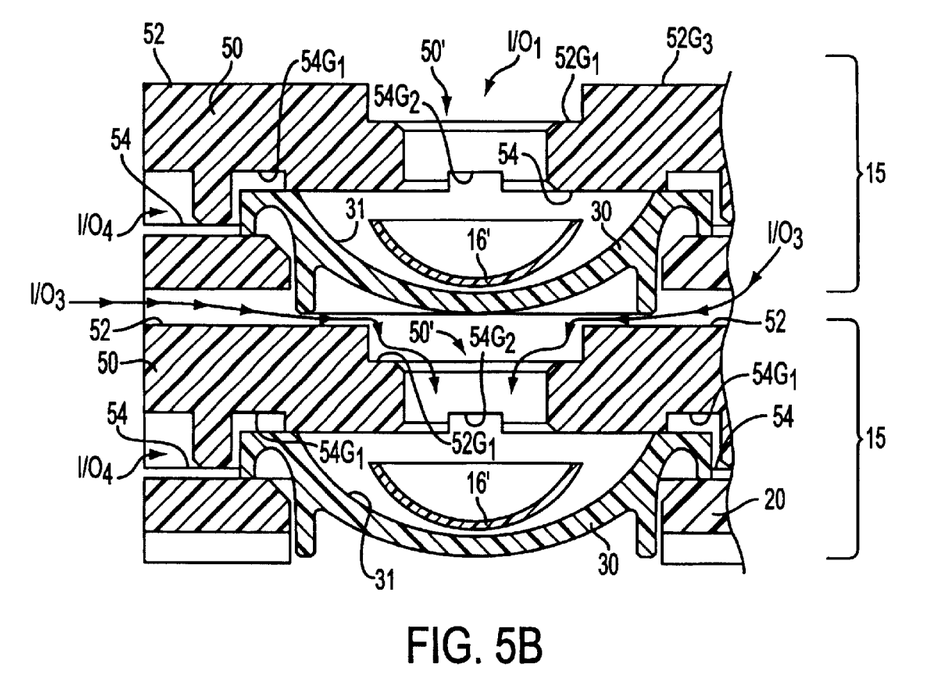
FIG. 5B is a view similar to FIG. 5A, and further including a second lens receptacle, associated pallet and cover stacked upon the lens receptacle pallet and cover of FIG. 5A.
Figure 6:
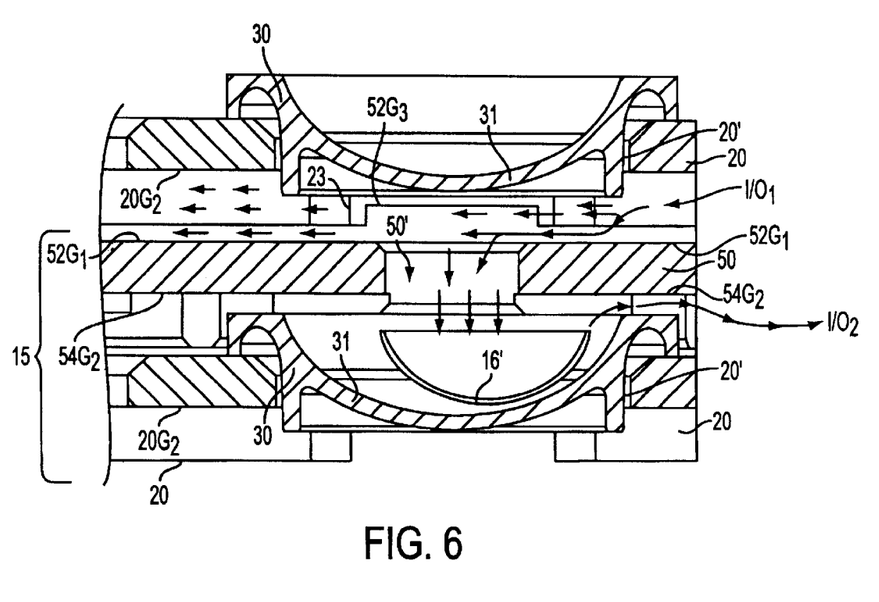
FIG. 6 is a cross-sectional view as taken along the line 6—6 in FIG. 3C, and further including a second lens receptacle and associated pallet stacked upon the lower pallet, receptacle and cover.

Referring to FIGS. 4A–C, lower surface grooves include circular grooves $54G_1$ which define stepped down, arcuate surfaces 54' (stepped down with respect to surfaces 54) about each hole 50'. A linearly extending groove $54G_2$ is defined along the three rows of five holes 50' from edge 51 to edge 53, and interconnect with grooves $52G_1$. Fluid flow into and out of assembly 15 is as follows:

Attention is turned to FIGS. 5 and 6, where FIG. 6 is a cross-section taken perpendicularly to the cross-sections of FIGS. 5A and 5B. As previously stated, it is preferred that a plurality of assemblies 15 are provided in stacked relation for batch processing, although the assemblies may be left unstacked if so desired. To prevent the assembly separating during fluid processing, means are provided (not shown) to releasably secure each assembly 15 together. Such securing means may take the form of an open-walled frame into which the assemblies are engaged in a manner preventing their separation from one another. Alternatively, clips or other securing means may be provided on each assembly 15 to releasably engage cover 50 to pallet 20.

In this regard, it is also noted that when one assembly 15 is stacked upon another assembly 15, the abutments 23 in the pallet 20 of a first assembly engage with surfaces $52G_3$ of the cover 50 of a second assembly, thereby preventing longitudinal translation of the pallet of the first assembly relative to the cover 50 of the second assembly.

Holes 50' provide fluid passage directly to receptacle 30 and respective lens 16'. In the preferred embodiment where stacked assemblies 15 are provided for batch fluid processing, the majority of fluid flow into assembly 15 and holes 50' occurs along grooves 52G$_1$ in the cover upper surface 51. Since the grooves 52G$_1$ extend to either side 51,53 of cover 50, fluid inlets/outlets "I/O$_1$" are defined at the side edges 51,53 wherethrough fluid enters as assembly 15 is submerged in a bath. It is preferred that assembly 15 be vertically oriented as it is submerged in the bath, with either side edge 51,53 being the leading edge into the bath. As fluid enters assembly 15 through inlets I/O$_1$, air is allowed to escape from between cover 50 and pallet 20 through I/I$_2$ which are formed at each edge 51,53 by linear grooves 54G$_2$ formed in cover lower surface 54. This ensures complete fluid flow to receptacles 30 and lenses 16'.

Referring to FIGS. 5A and 5B, it is noted that some fluid will also enter at I/O3 locations along the opposite side edges 55,57 of cover 50, as well at I/O$_4$ (see also FIG. 3C), although fluid entry/exit at these locations will be less than at I/O$_1$. The spacing between pallet 20 and cover 50 which defines I/O$_4$ is created by cover surface 54' abutting the top surface 32 of receptacle 30 upon cover 50 fully seating upon pallet 20 (see also FIGS. 3B and 3D). This engagement between surfaces 54' and receptacle top surface 32 creates a stop preventing further downward movement of cover 50, with lower cover surface 54 coming to rest slightly above pallet 20. It is seen that fluid will flow through I/O$_4$, reach groove 54G$_1$, and travel to groove 54G$_2$, ultimately reaching hole 50', although it is again emphasized that fluid through I/O$_4$ will be much less that that occurring along grooves 52G$_1$.

It is also noted that cover surfaces 54' cover only a radially inward segment of the entire top surface 32. This is preferred over a complete engagement of top surface 32 since the wetting of the assembly between these surfaces would otherwise create difficulty upon removal of cover 50 from pallet 20.

Upon removing assemblies 15 from the bath, fluid will drain back through all I/O locations. It is preferred that the assemblies are removed from the bath in the same vertical orientation in which they were initially submerged. If desired, assemblies 15 may be passed through any number of sequential baths as required.

What is claimed is:

1. An assembly for fluid processing a plurality of ophthalmic lenses, said assembly comprising:

a) a unitary support for holding said plurality of contact lenses in a predetermined array upon said support, said support having first and second opposite side edges and an upper surface and lower surface;

b) a unitary cover removably positioned in contacting, covering relation to said support, said cover having first and second, opposite side edges and an upper surface and a lower surface, said cover further including a plurality of through-holes formed therein and extending from said upper surface to said lower surface thereof, said through-holes aligning with said plurality of contact lenses, respectively, upon placement of said cover on said support, said cover further including a first series of grooves integrally formed in said upper surface thereof, said first series of grooves interconnected with said through-holes and creating a fluid passageway therewith extending from said first and second side edges of said support and cover to said lenses.

2. The assembly of claim 1, and further comprising:

a) a plurality of receptacles in which said plurality of lenses are removably deposited; and b) a plurality of through-holes formed in a predetermined array in said support in which said plurality of receptacles are removably positioned.

3. The assembly of claim 2, wherein said receptacles form a package for a respective said lens.

4. The assembly of claim 1 and further comprising a second series of grooves integrally formed in said cover from said first side edge to said second side edge thereof, said second series of grooves providing a fluid passage for the outlet of air from between said support and said cover as said assembly is placed in a bath of fluid, said second series of grooves further acting as a fluid passage for the drainage of said fluid from between said cover and said support as said assembly is removed from said bath.

5. The assembly of claim 4 wherein said second series of grooves are formed in said lower surface of said cover.

6. The assembly of claim 5, wherein said second series of grooves extend across said through-holes in said cover.

7. The assembly of claim 1, and further comprising a plurality of said assemblies placed upon each other in stacked relation.

8. The assembly of claim 1, and further comprising a pick-and place head for placing said lens on said support, said pick-and-place head configured for removably extending through a respective through-hole in said cover, and further comprising means for supporting said cover over said support as said lens is placed on said support and for releasing said cover upon said support once said lens has been placed on said support with said pick-and-place head withdrawing from said through-hole.

9. The assembly of claim 8 wherein said through-holes in said cover each have a diameter which is smaller than a respective diameter of a said lens to prevent passage of a lens therethrough.

* * * * *